Nov. 23, 1965      A. ROCHE      3,219,274
PAINT SPRAY GUN HAVING PAINT WARMING AND AIR HEATING CHAMBERS
Filed June 12, 1963
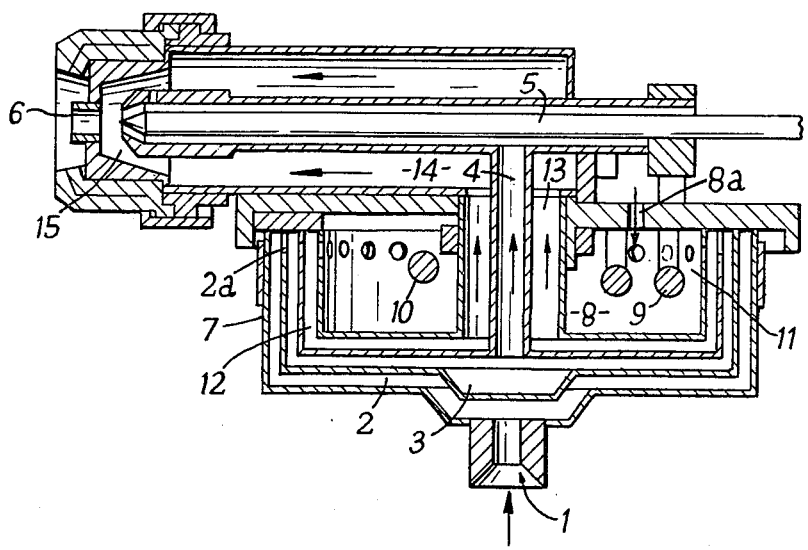
INVENTOR:
ANDRÉ ROCHE

United States Patent Office 3,219,274
Patented Nov. 23, 1965

3,219,274
PAINT SPRAY GUN HAVING PAINT WARMING
AND AIR HEATING CHAMBERS
André Roche, 45 Ave. St. Gerome, Aix, France
Filed June 12, 1963, Ser. No. 287,307
Claims priority, application France, June 12, 1962,
19,766, Patent 1,324,780
1 Claim. (Cl. 239—133)

The hot spraying of paints offers numerous advantages, but the processes at present used do not enable satisfactory results to be obtained. It is important, in fact, to heat the paints within a very short time, and at the exact moment when they are being applied, as otherwise there is a risk of deterioration in the substance used. The fact is that although certain paints can stand up to a prolonged heating-process without suffering any apparent deterioration, there are others which deteriorate rapidly.

The object of the invention is to provide a heating-device enabling the paint to be brought to the desired temperature at the exact moment when it is used, while conveying it, in a current of hot air, to the surface to which it is to be applied, yet without any risk of accumulation of heat.

It is characterised by the means used, considered both in conjunction with one another and independently of one another, and more particularly by the provision of a heating-chamber with perforated walls, underneath the spraying-device and integral with the spray-gun, the said chamber distributing the hot air in motion in a circular zone enveloping the circuit followed by the paint and accompanying it as it is sprayed onto the surface where it is distributed, the paint being conveyed through peripheral circular conduits to the walls of the heating-chamber, ensuring a progressive temperature-increase on limited thickness.

The hot spraying of paints offers numerous advantages, but the processes at present used do not enable satisfactory results to be obtained. It is important, in fact, to heat the paints within a very short time, and at the exact moment when they are being applied, as otherwise there is a risk of deterioration in the substance used. Although certain paints can stand up to a prolonged heating-process without suffering any apparent deterioration, there are others which deteriorate rapidly.

The object of the present invention is to provide a heating device enabling the paint to be brought to the desired temperature at the exact moment when it is used and to convey it in a current of hot air to the surface to which it is to be applied, yet without any risk of overheating.

According to the present invention, in a radially symmetrical spray gun for paint which comprises a nozzle having inner and outer passages, respectively for paint and compressed air, and a central air heating chamber containing electrical heating means connected to said outer passage and disposed below said nozzle, there is provided the improvement consisting of the combination of:

(a) a paint conduit connected to said inner passage feeding paint in a thin stream under pressure, through means defining tortuous path, to said inner passage;

(b) a hot air feed conduit disposed adjacent to, axially concentric to, and radially within said conduit in communication with said outer passage;

(c) a paint warming chamber, enclosing said hot air conduit, through which paint flows under pressure toward said paint conduit, said paint warming chamber being enclosed by the wall of said central hot air conduit, and (d) a central annular air heating chamber having perforate walls communicating with said air conduit and having said air and paint conduits passing upward through the annulus thereof.

Preferably the air feed conduit and the outer passage surround the entire length of the paint conduit and inner passage, such that the paint is subjected to heating throughout its travel along the paint conduit and inner passage.

An embodiment of paint spray gun in accordance with the invention is hereinafter particularly described by way of example with reference to the accompanying drawing, which is a longitudinal section through the spray gun.

The paint is caused to flow under pressure into a conduit 1, and enters the surrounding channel 2 through which it travels and subsequently passes through an opening 2a into a channel 3, thereafter passing into an axial passage 4 and thence into a spraying-tube 5 leading to a nozzle 6.

An air heating device is disposed axially in a housing 7 and comprises a chamber 8, into which air pressure enters through an inlet 8a electrical heating resistances 9 and 10, and perforated wall 11. The latter permits passage of heated air into a surrounding channel 12 communicating with an annular axial passage 13.

The heated air then passes into a conduit 14 of the spray-gun and provides a jet of air which, passing through the nozzle 15, effects the spraying.

The chamber 8 eliminates any risk of overheating because the perforated wall 11 permits circulation of the heated air into the surrounding channel 12.

The wall of channel 12 has a considerable area of contact with the channel 3 through which the paint passes, and the small thickness of the intervening wall permits rapid transfer of heat.

Starting from a separate storage container, in which the paint is cold, it passes into the channel 2 and is heated in the channel 3 and passage 4, the heated air stream accompanying and surrounding the paint until the latter reaches the nozzle 15.

The space occupied by the air heating device, and the weight thereof, are negligible, and the air in circulation is utilized as a heat-exchange medium. This air has a dual function: it transfers heat to the flow of paint, and also ensures that the application of the paint to the surface to be decorated takes place in heated surroundings. The paint is deposited in a hot state on the surface. Furthermore, the viscosity of the paint is reduced, enabling the pressure of the current of air to be reduced likewise. This reduction of pressure itself eliminates the cooling expansion-effect, thus avoiding "fog," rendering the operation less injurious to the health of the user and enabling the paint to be used more economically.

Finally, the paint is heated while it is being actually used.

I claim:

In a radially symmetrical spray gun for paint comprising a nozzle having inner and outer passages, respectively for paint and compressed air, and a central air heating chamber containing electrical heating means connecting to said outer passage and disposed below said nozzle, the improvement consisting of the combination of:

(a) a paint conduit connected to said inner passage feeding paint in a thin stream under pressure, through means defining a tortuous path, to said inner passage;
(b) a hot air feed conduit disposed adjacent to, axially concentric to, and radially within said paint conduit in communication with said outer passage;
(c) a paint warming chamber, enclosing said hot air conduit, through which paint flows under pressure toward said paint conduit, said paint warming chamber being enclosed by the wall of said central hot air conduit; and
(d) a central annular air heating chamber having perforate outer walls communicating with said air conduit and having said air and paint conduits passing upward through the annulus thereof.

References Cited by the Examiner
UNITED STATES PATENTS

| | | | |
|---|---|---|---|
| 2,499,447 | 3/1950 | Axelson et al. | 239—133 |
| 2,551,078 | 5/1951 | Wing | 239—134 |
| 2,942,787 | 6/1960 | Bok et al. | 239—139 |
| 2,974,874 | 3/1961 | Raymond | 239—139 |
| 3,003,704 | 11/1961 | Roche | 239—424 |

FOREIGN PATENTS 878,667   10/1942   France.

M. HENSON WOOD, Jr., *Primary Examiner.*
EVERETT W. KIRBY, *Examiner.*